United States Patent [19]

Greiner

[11] 3,868,571

[45] Feb. 25, 1975

[54] CB MICROPHONE-AM/FM RADIO CONTROL WITH AM-FM RADIO CUT OFF SWITCH AND MICROPHONE HOLDER

[76] Inventor: Lawrence J. Greiner, 209 West Broad St., Burlington, N.J.

[22] Filed: Nov. 12, 1973

[21] Appl. No.: 414,991

[52] U.S. Cl. ............. 325/15, 179/2 B, 200/61.58 R

[51] Int. Cl...... H04b 1/38, H04m 11/00, H01h 3/16

[58] Field of Search ....... 200/61.58 R, 61.59, 61.81, 200/159 R, 318, 295, 324, 330, 338; 248/309, 313; 179/1 DD, 1 H, 1 HF, 1 HT, 1 VE, 146 R, 147, 153, 157, 168, 2 B, 2 D, 100 C, 100 D, 158–167; 325/15, 21

[56] References Cited

UNITED STATES PATENTS

| | | | |
|---|---|---|---|
| 1,775,567 | 9/1930 | Lewis | 179/2 B |
| 2,165,693 | 7/1939 | Bross | 179/2 B |
| 2,170,374 | 8/1939 | Leonard | 179/2 B |
| 2,212,792 | 8/1940 | Reading | 200/61.58 R X |
| 2,443,329 | 6/1948 | Sears | 179/146 R |
| 2,503,095 | 4/1950 | Butler | 179/2 B |
| 2,549,676 | 4/1951 | Dunn et al. | 200/61.58 UX |
| 2,567,318 | 9/1951 | Braun | 200/61.58 X |
| 2,800,543 | 7/1957 | Herzog | 200/61.58 R |
| 3,145,375 | 8/1964 | Webb | 200/61.58 R X |
| 3,532,823 | 10/1970 | Ellis | 179/2 B |
| 3,665,310 | 5/1972 | Tweed, Jr. | 325/21 |

*Primary Examiner*—James R. Scott

[57] ABSTRACT

A microphone holder having a slot for receiving the headed shank of a microphone, and a switch located for operative engagement by the shank head to electrically close the switch, so that the switch connected in an AM/FM radio will automatically disable the latter upon use of the CB radio, and return the AM/FM radio to operation upon replacement of the CB microphone in the holder.

6 Claims, 4 Drawing Figures

CB MICROPHONE-AM/FM RADIO CONTROL WITH AM-FM RADIO CUT OFF SWITCH AND MICROPHONE HOLDER

BACKGROUND OF THE INVENTION

As is well known to those employing CB radio, particularly mobile units, as during driving or the like, the procedure for disabling or turning off the usual broadcast band, say an AM/FM radio, upon initiating use of the CB radio, involves somewhat cumbersome, awkward and time-consuming manipulations. In addition to the inconvenience experienced, this procedure may be distracting to one primarily engaged in operating a vehicle, although the end result of both AM/FM radio and CB radio may well be to enhance the operator's alertness and safe driving ability over long periods of time.

SUMMARY OF THE INVENTION

Accordingly, it is an important object of the present invention to provide a unique device which automatically disables or turns off an AM/FM radio upon use of a CB radio.

It is a more particular object of the present invention to provide a unique holder construction for a CB radio microphone which includes switch means connected in the power circuit of an AM/FM radio operative to open and disable the latter radio upon use of the CB microphone.

It is still a further object of the present invention to provide a CB microphone holder of the type described and having the advantageous characteristics mentioned in the preceding paragraphs which is extremely simple in construction, capable of economic mass production for sale at a reasonable cost, and which is staunch and durable in structure for reliable operation throughout a long useful life.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENT

Figure 1:
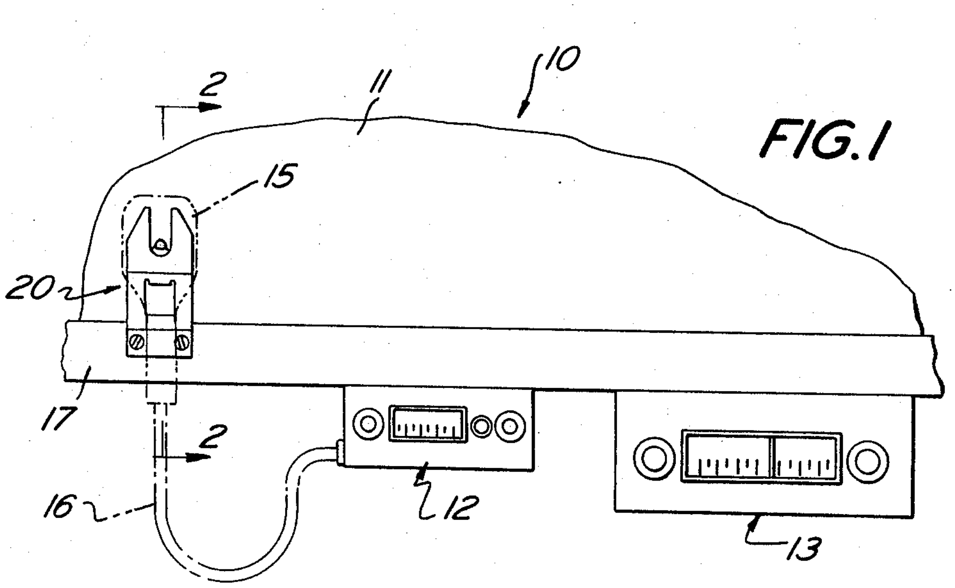
FIG. 1 is a partial front elevational view of the interior of a motor vehicle, with a CB microphone shown in phantom.

Referring now more particularly to the drawings, and specifically to FIG. 1 thereof, a vehicle is generally designated 10, including a dashboard 11 to which may be mounted conventional electronic equipment, such as a Citizen Band radio 12, and conventional broadcast radio 13. Hereinafter, the Citizen Band and conventional radios will be called, respectively, CB and AM/FM. The CB and AM/FM radios may be mounted otherwise in the vehicle 10, if desired, and the former may include a microphone 15 electrically connected to the set by a cable 16.

The dashboard 11 may provide a generally upright surface 17, facing rearwardly toward the vehicle operator, to which is affixed or otherwise suitably mounted a holder, generally designated 20, for holding the CB microphone 15.

Figures 2, 3, 4:
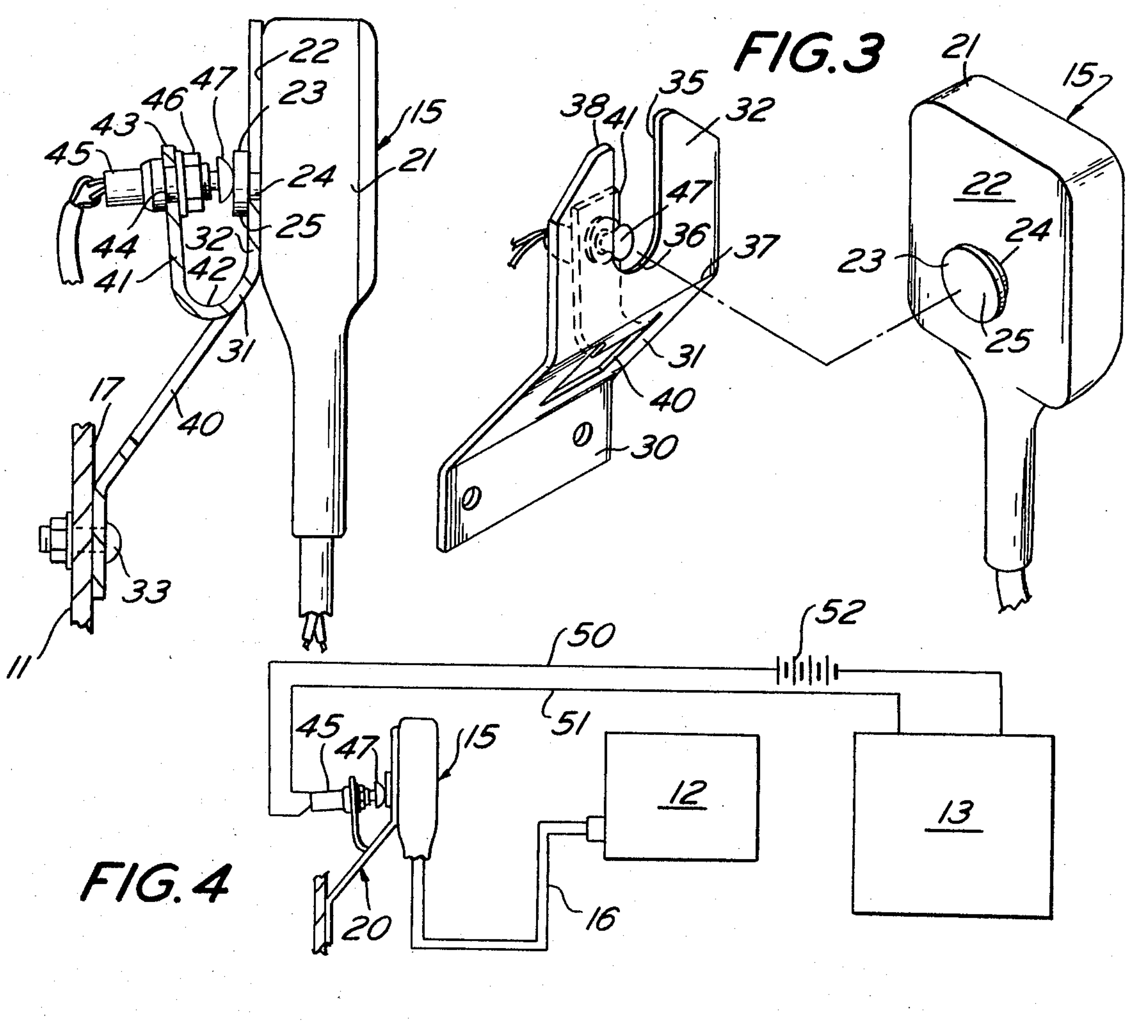
FIG. 2 is a partial sectional elevational view taken generally along the line 2—2 of FIG. 1, enlarged for clarity.
FIG. 3 is a perspective view illustrating the holder and microphone of FIG. 2 but in a separated condition of use.
FIG. 4 is a schematic diagram showing the electrical circuitry of the instant invention.

Considering now FIGS. 2 and 3, it will there be seen that the microphone 15 includes a relatively large body 21 for containing the mechanism of the microphone. Projecting from one surface of the body, say the rear surface 22, may be a stud 23 having a reduced portion or shank 24 and an enlarged portion or head 25. That is, the reduced portion or shank 24 may project from and generally normal to the rear surface 22 of microphone body 21, and there is provided on the outer end of the shank 24 an enlargement or head 25. The microphone construction described above may be conventional.

The holder or support 20 may advantageously be fabricated of a single sheet of material, such as stiff bendable material or metal, say aluminum, but may also be otherwise fabricated, say by molding of plastic, if desired. In the illustrated embodiment of holder or support 20, the structure is entirely fabricated of a single sheet of metal or similarly formable material, and includes a bottom portion or base 30 disposed generally upright and suitably fixed, as by fasteners 33, to a suitable supporting surface, say the upright rearwardly facing surface 17 of dashboard 11. The base 30 may be generally rectangular, and an offsetting portion, say integral with the base 30, may upstand obliquely from the upper edge of the base, as at 31. The offsetting portion 31 extends rearwardly or outwardly from the dashboard 11, say inclining upwardly and rearwardly, and terminates at its upper edge in integral connection with a generally upright upper or receiving portion 32. That is, the upper, receiving portion 32 upstands in spaced relation with respect to the dashboard 11, being spaced rearwardly therefrom by the offsetting lower portion 31.

The upper receiving portion 32 is formed with a slot 35 extending downwardly through the upper edge of the upper receiving portion and terminating at a closed lower slot end 36 adjacent to and spaced over the juncture line or bend 37 with the offsetting portion 31. Viewed otherwise, the slot 35 extends generally vertically and opens at its upper end through the upper edge 38 of the receiving portion 32.

Formed from the material of the lower offsetting plate portion 31, generally centrally thereof, as by a generally U-shaped cut 40, is a finger or extension 41 which is bent to extend upwardly in the space between receiving portion 32 and the dash 11. That is, the cutout region or extension finger 41 is bent, as at 42 and extends therefrom generally upwardly and obliquely forwardly, away from the generally upright receiver portion 32, terminating in a free end region 43. The free end region 43 may be formed with a through hole 44, and a push-button switch 45 may extend through the hole 44, being clamped in position therein, as by clamping means or nut 46. Thus, the switch 45 extends generally normal to the finger portion 43, the latter serving to mount the switch with its push-button actuator 47 projecting toward a lower region of slot 35. The push-button 47 is depressible obliquely downwardly and forwardly by the inclination of the switch 45 and its mount 43. In practice, the switch 45 may be normally open and closed upon depression of its actuating member or button 47.

Considering now the schematic diagram of FIG. 4, the CB radio 12 may be suitably powered, by any conventional means (not shown), and the microphone 15 has its cable 16 connected to the CB radio. The microphone support 20 carries the normally open push button switch 45, the latter having conductors 50 and 51 connected to the braodcast or AM/FM radio 13, as through a power source or battery 52. Thus, when the button 47 of switch 45 is depressed, a power circuit is closed through broadcast radio 13, and when the button 47 is released, the normally open switch 45 opens the power circuit to radio 13.

As best seen in FIG. 2, with the microphone 15 supported or carried by the holder 20, the shank 24 is received in the slot 35, gravitating to a lower region thereof, and the shank head 25 is on the back or forward side of the receiver portion 32 being in depressing engagement with the switch button 47. That is, when the microphone 15 is held by the holder 20, a nonuse condition of the microphone, the switch 45 is closed to enable the AM/FM radio 13 to be operated. However, upon upward withdrawal of the microphone 15 from the holder 20, removing the shank 24 from slot 35 and head 25 from depressing engagement with button 47, then switch 45 is electrically open to disable an AM/FM radio 13 so as to permit CB operation without interference.

From the foregoing, it will be seen that the present invention provides a microphone holder for a Citizen Band radio which automatically disables an AM/FM radio upon removal of the CB microphone for use, and which otherwise fully accomplishes its intended objects.

Although the present invention has been described in some detail by way of illustration and example for purposes of clarity of understanding, it is understood that certain changes and modifications may be made within the spirit of the invention.

What is claimed is:

1. In combination, a radio, a CB microphone including a body and a headed shank projecting from the body, and a holder for said microphone, said holder comprising a base, plate means upstanding from said base and of a thickness approximating the shank dimension between said body and head, said plate means having a generally upwardly opening slot adapted to slidably and gravitationally receive said shank with the body on one side of said plate means and the shank head on the other side of said plate means, and a resiliently biased normally open switch carried by said base and connected to said radio, and a button located in said switch for sliding engagement by said shank head when said shank is slid into said slot and configured to be shiftable by said head engagement for closing said switch, whereby said switch is open when the microphone is removed from said holder for disabling said radio.

2. The combination according to claim 1, said base being adapted for attachment to an upright supporting surface, and said plate means comprising a lower offsetting portion extending outwardly from said base for termination spaced from said supporting surface, and an upper receiving portion upstanding from the outward terminal region of said lower portion and having said slot, said switch being located generally over said offsetting portion.

3. The combination according to claim 2, in combination with a switch mount formed from material of said lower portion and extending upwardly proximate to said upper portion for supporting said switch.

4. The combination according to claim 1, said switch being located with its button depressible at least partly downwardly on engagement by said shank head.

5. The combination according to claim 4, said switch button being depressible obliquely downwardly for engagement of said shank head between said plate means and button.

6. The combination according to claim 5, in combination with a switch mount formed from material of said lower portion and extending upwardly proximate to said upper portion for supporting said switch.

* * * * *